June 11, 1963   K. M. SPARROW   3,093,782
DYNAMO ELECTRIC MACHINE

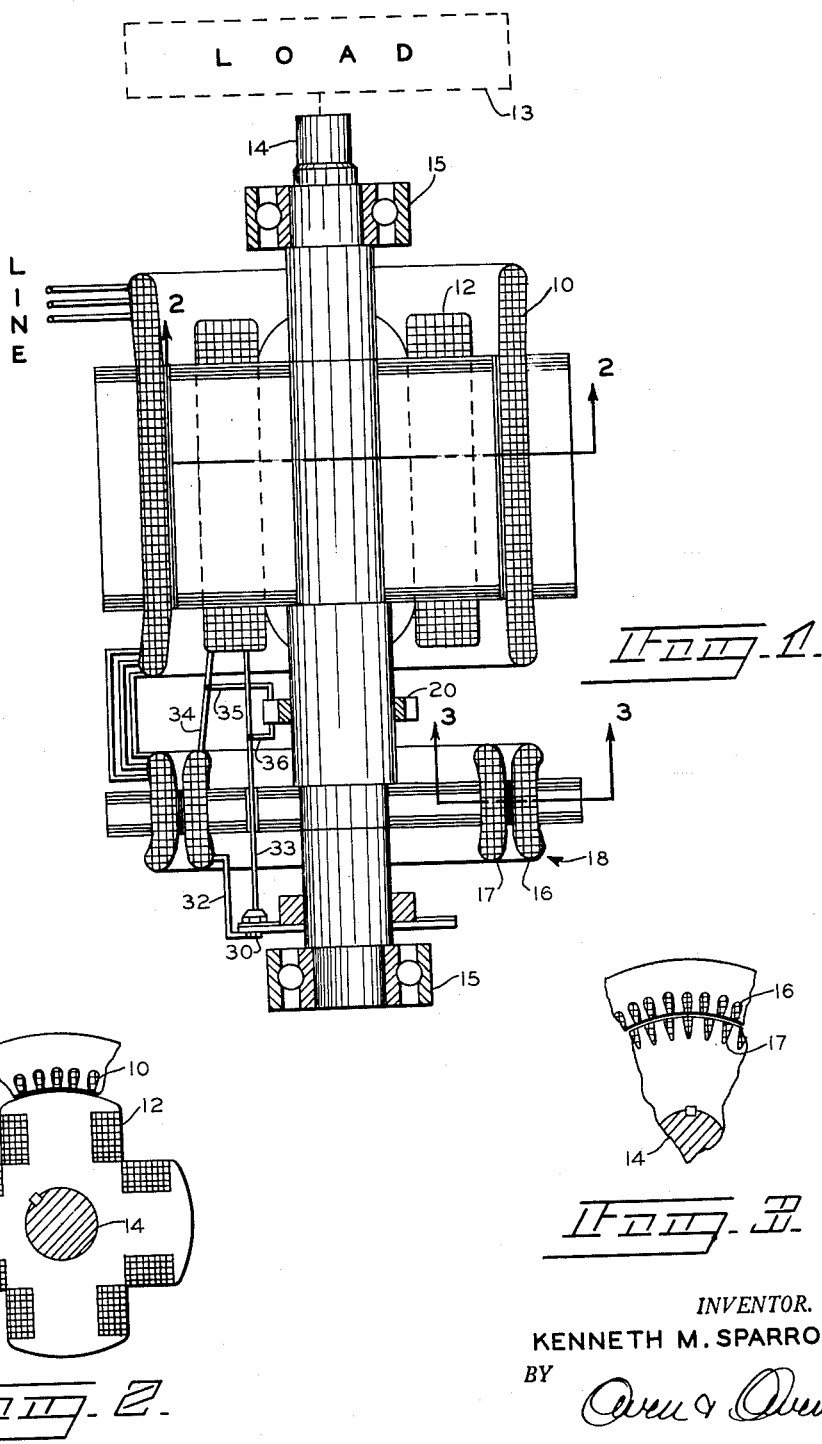

Filed June 13, 1960   4 Sheets-Sheet 3

INVENTOR.
KENNETH. M. SPARROW
BY Owen & Owen

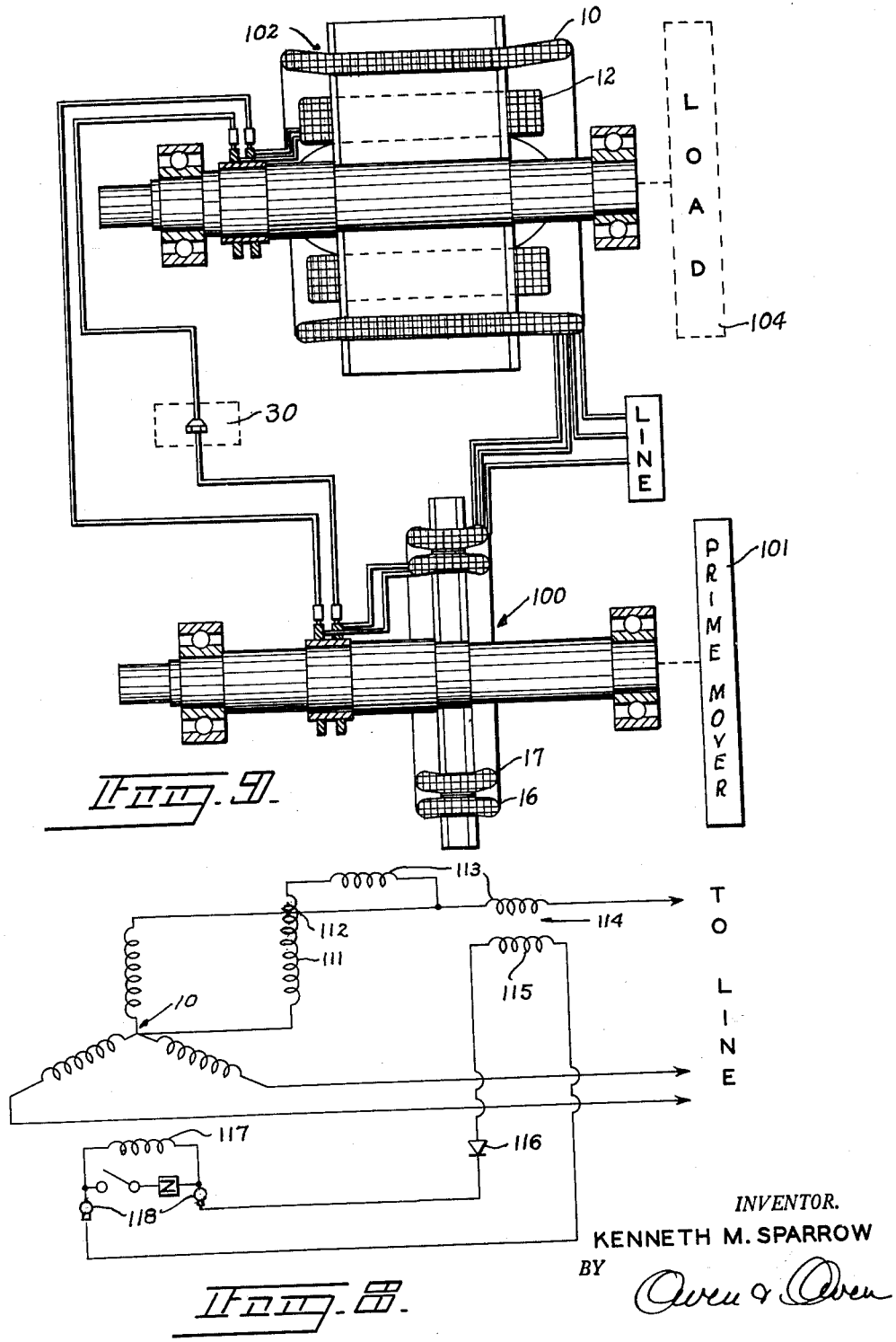

United States Patent Office 3,093,782
Patented June 11, 1963

3,093,782
DYNAMO ELECTRIC MACHINE
Kenneth M. Sparrow, Lima, Ohio, assignor to Lima Electric Motor Co., Inc., Lima, Ohio, a corporation of New York
Filed June 13, 1960, Ser. No. 35,467
2 Claims. (Cl. 318—186)

This invention relates to dynamo electric machines and is particularly directed to a novel excitation system for the field of a synchronous motor.

One of the primary objects of the invention is to provide means to supply excitation current to a synchronous motor in the form of rectified alternating current derived from a current transformer exciter, the primary of which is energized from a voltage representing only a relatively small portion of the motor line voltage and the secondary of which is connected through a rectifier to the motor field winding.

Another object of the invention is to provide, in the excitation circuit described above, a control device in connection with the primary of the current transformer exciter which will operate to vary the current in the field of the synchronous motor whereby the motor power factor may be adjusted or controlled, and in which the exciter response to a change in the load is unusually rapid.

Still another object of the invention is to provide means to supply excitation current to a synchronous motor from a current transformer exciter having a compound or divided primary winding, one portion of which is shunted across a voltage representing only a small portion of the motor line voltage and the other portion of which carries a current proportional or equal to the motor line current, the secondary of said current transformer exciter being connected through a rectifier to the motor field winding.

It is a further object of the invention to supply excitation to the field of a synchronous motor which increases as the load increases, the increase in exciter output being instantaneous with an increase in line current.

It is still a further object of the present invention to provide an inherent regulation characteristic for the current transformer exciter above mentioned which supplies rectified power to the field circuit of a synchronous motor whereby the output power of the exciter is inherently influenced by the line current of the motor to provide a compounding characteristic to the motor to maintain an approximately constant power factor regardless of motor load.

Still another object of the invention is to provide means to supply excitation current to the field of a synchronous motor from a current transformer exciter, the primary of which carries a current proportional or equal to the motor line current, the secondary of said current transformer exciter being connected through a rectifier to the motor field winding.

It is a further object of the present invention to provide a regulator circuit for the current transformer exciter above mentioned which supplies rectified power to the motor field rectified secondary exciter power applied to the motor field circuit whereby the output power of the exciter may be reduced during starting and acceleration of the motor.

It is a further object of the present invention to provide a novel and useful means of presenting a relatively low impedance circuit in parallel with the motor field to limit the transformer voltage induced in the motor field winding during starting and acceleration of the motor.

It is a further object of the present invention to provide an improved brushless D.C. excited synchronous motor using a fast response rotating current transformer induction frequency converter exciter, a rotating rectifier unit to apply rectified voltage to the motor field circuit from the output voltage of the exciter rotor winding, and also having a rotating impedance unit permanently connected in parallel with the motor field winding to limit the induced alternating voltage on the motor field winding during starting and acceleration of the motor, and having in addition a variable impedance in the primary circuit of the current transformer exciter whereby the exciter output may be reduced during starting and acceleration of the motor, said variable impedance being used during operation of the motor for manual or automatic control of the motor power factor; the motor rotor, exciter rotor and impedance units being mounted on a common shaft.

Other objects and advantages of the invention will become apparent from the following description of a preferred form thereof, reference being had to the accompanying drawings, in which:

FIGURE 1 is a diagrammatic, fragmentary sectional view of a synchronous motor embodying the present invention;

FIGURE 2 is a fragmentary section on line 2—2 of FIG. 1;

FIGURE 3 is a fragmentary sectional view taken on line 3—3 of FIG. 1;

Figure 4:
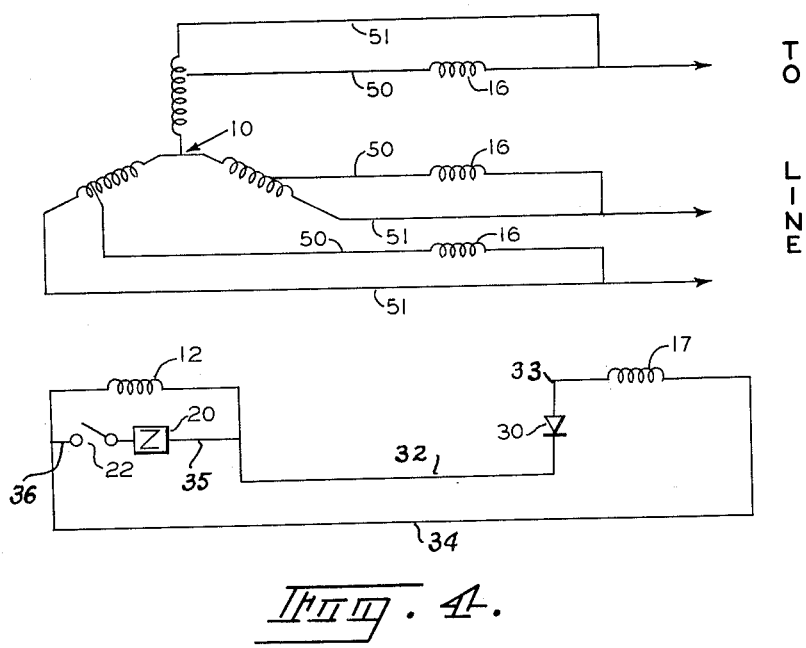

FIGURES 4 to 8, inclusive, are circuit diagrams of synchronous motors embodying the present invention;

FIGURE 9 is a digrammatic view, with parts in section, of a modified form of the invention.

Referring to the drawings, the present invention is shown in conjunction with a synchronous motor having a stator winding 10 and a rotating field winding 12, each of said windings being associated with appropriate laminated core structures. The motor is shown diagrammatically and drives an appropriate load 13. The field coils and their magnetizable laminations are carried on a shaft 14 journaled in appropriate bearings 15 at each end, and in the form shown in FIG. 1 an exciter designated generally 18 is carried on the same shaft. A rotating impedance unit 20 is also carried on said shaft for a purpose hereinafter described.

In the preferred form of brushless synchronous motor described above, the exciter 18 comprises a rotating current transformer induction frequency converter and is similar in form to a wound rotor induction motor, the stator 16 and rotor 17 of which comprise stacks of relatively thin magnetic laminations and appropriate windings. The exciter stator 16 and rotor 17 can be wound either single-phase or multiple-phase, and the exciter rotor is preferably wound with the same number of poles as the exciter stator windings. FIG. 4 shows a circuit including an exciter of the single-phase winding type, while FIG. 5 indicates the circuit using a multiple-phase exciter winding.

Figure 6:
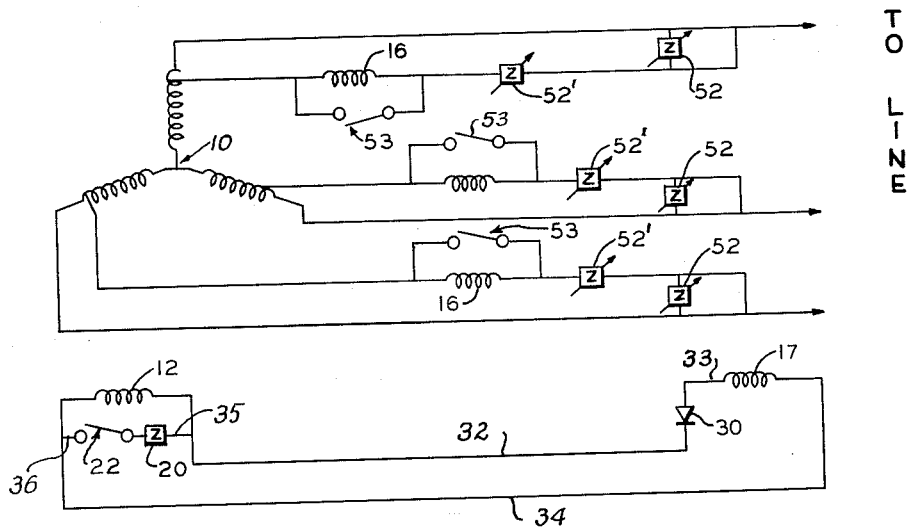
Figure 7:
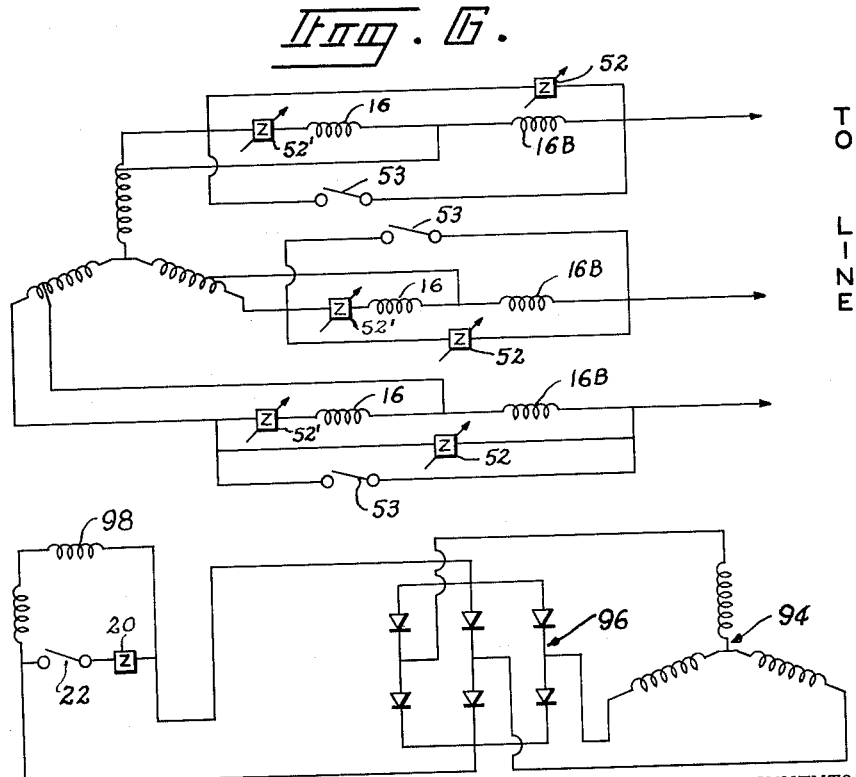

As shown in FIGS. 6 and 7, the impedance unit 20 may be connected in parallel with the motor field winding 12 to provide an impedance path to limit the transformer voltage induced in the motor field winding from the motor stator winding during the starting and acceleration of the motor. This impedance unit may be arranged to be connected and/or disconnected from the motor field circuit by manual or automatic control after starting and acceleration of the motor. For the brushless type synchronous motor this impedance unit is arranged in the form of a rotating impedance unit 20, and is permanently connected in parallel with the motor field winding 12. When the impedance unit 20 is permanently connected in parallel with the motor field winding it is preferable that this impedance unit 20 have non-linear impedance characteristics to exhibit a maximum impedance at voltages corresponding to the transformer voltage induced in the motor field windings during starting and acceleration of the motor. However, an impedance unit consisting of a resistor unit which has approximately five times the resistance of the motor field winding will give satisfactory operation and may be permanently connected in parallel with the motor field winding 12 as above described. Under these conditions the exciter unit will be called upon to provide approximately twenty percent additional power which will be absorbed by resistance unit 20. However, the advantages of this type of brushless unit more than make up for this parasitic resistance load under normal motor operating conditions.

The exciter 18 is preferably of the form of a wound rotor induction motor having its windings arranged to provide the same number of poles on the rotor as on the stator. Thus, the exciter rotor 17 becomes virtually the secondary of a rotating current transformer induction frequency converter while the stator 16 acts as the primary winding thereof.

With the advent of silicon diodes which are capable of carrying relatively heavy current, it becomes possible to rectify the output of the current transformer exciter and to supply the rectified A.C. to the field coils of the motor. The silicon diodes, or similar rectifiers, are indicated at 30 in FIG. 1 and are connected, as shown, by leads 32 to the exciter rotor windings 17 and by leads 33 to the field windings 12. The opposite ends of the windings 12 and 17 are connected together as at 34. The resistor unit 20 is connected in parallel with the motor field winding 12 by leads 35 and 36. While a single rectifier is shown in the drawings it will be appreciated that these devices may be paralleled to whatever extent is desired, depending on the magnitude of the current involved, and can be connected as full wave rectifiers instead of the half-wave rectifier connections shown in the drawings, or connected as multi-phase rectifiers corresponding to the exciter rotor winding.

Turning now to the circuit diagrams shown in FIGS. 4 to 8 inclusive, the excitation system of the present invention is shown basically in FIGURE 4 with the stator of the motor represented as a three-phase, star connected unit 10. The field of the motor is shown at 12 and is connected through rectifier 30 to the secondary windings of the exciter which is here represented as a current transformer, the primary comprising the exciter stator windings 16 and the secondary exciter rotor windings 17. The exciter stator windings 16 are connected to a relatively small portion of the motor power winding 10 as indicated by the connection made close to, but not at, the end of each of the phase windings of the motor stator. An impedance unit 20 which may be connected in parallel with the motor field windings by contactor 22 acts to limit the transformer voltage induced in the motor field winding 12 during starting and acceleration of the motor. A brushless unit may be made by placing the rotor 17, rectifier 30, and motor field 12 on a common shaft. In this case, the impedance unit 20 will preferably be in the form of a resistance permanently shunting the motor field winding.

In the event that the rotating current transformer induction frequency converter exciter is separately driven or if a stationary current transformer exciter is used, slip rings will be necessary to connect the output of the current transformer exciter secondary through suitable rectifiers to the rotating field coil 12 of the generator and to connect the starting resistance unit 20 in parallel with the motor field winding.

The motor is provided with a tapped winding in its stator winding, and leads 50 and 51 connect therefrom to the primary 16 of the exciter unit which would be the stator of a rotating current transformer induction frequency converter exciter, or the primary of a stationary current transformer exciter. The voltage of the tapped portion of the motor winding represents only a small portion of the voltage of the entire winding. Thus a small voltage is available to cause current flow through the current transformer exciter primary 16 and an A.C. voltage is induced in the exciter secondary 17. The exciter primary voltage would have in the exciter stator 16, the same frequency of the motor.

In the case of a rotating current transformer induction frequency converter exciter, the exciter rotor 17 delivers its power at a frequency proportional to the relative speeds of the exciter primary field 16 and the exciter rotating member 17. For example, if the exciter is wound with the same number of poles as the motor, and is driven at the same speed as the speed of the motor rotor, the frequency of the voltage appearing at the output of the exciter rotor would be either zero frequency or twice the motor line frequency depending on the connections. The double frequency connection is preferred. Of course, a variation in rotational speed of exciter rotor and motor rotor will give other frequencies, as is known in the art. The output voltage of the exciter is rectified by rectifier 30 and applied to the motor field windings 12.

As indicated in FIGS. 6 and 7 power factor control of this system can be obtained by the insertion of a variable impedance 52 in parallel with the primary of the current transformer exicter. A variable impedance may also be connected in series with the shunt portion of the primary of the current transformer exciter as indicated at 52' in FIGS. 6 and 7, if desired.

The variable impedance in the exciter stator winding circuit or a separate contactor 53 may be used to reduce or limit the exciter secondary rectified output power applied to the motor field during starting and acceleration of the motor.

It will be seen that the response time of the exciter 18 with a change in load of the systems described above is very fast since the exciter carries only an A.C. voltage corresponding to the load current which appears immediately in the current transformer exciter primary, and an increase in load current will cause an immediate increase in the flux linking the exciter secondary and thus an increase in the exciter voltage output which is rectified and applied to the motor field.

To obtain compounding characteristics the exciter primary winding 16 may be connected in series with the power winding circuit of the motor as shown in FIG. 7 whereby the secondary output voltage of the exciter is influenced by the line current of the motor. It will be seen that it is possible to obtain both fixed and compounding characteristics in the current transformer exciter by connecting a portion of the exciter primary windings across a small portion of the A.C. voltage derived from the motor line voltage. Another portion of the exciter primary winding, designated 16B, is connected in series with the power windings of the motor. In the case of a rotating current transformer induction frequency converter exciter it is preferable that a balanced consequent pole connection be used in the exciter stator winding whereby in each phase all poles of a given polarity are used in the shunt portion of the stator winding and in each phase all poles of the opposite polarity are used in the series or compounding portion of the stator winding.

Figure 5:
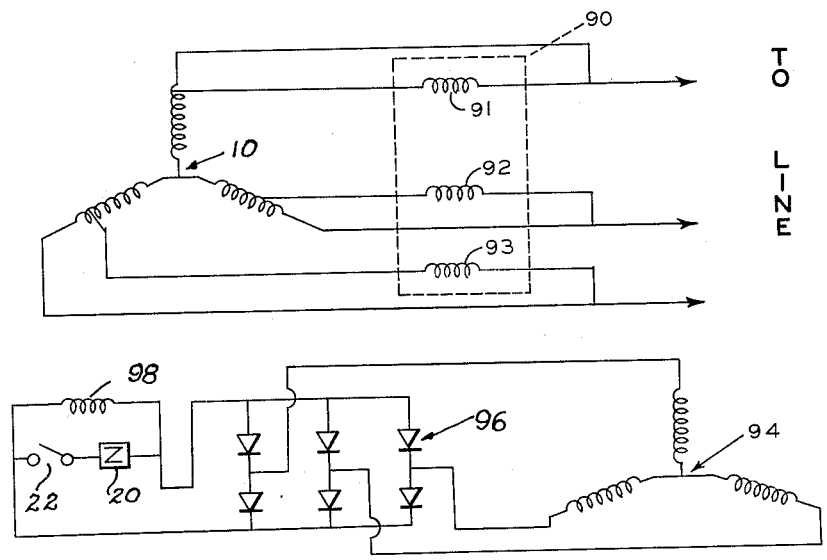

In the circuit diagrams shown in FIGS. 4 and 6, the current transformer exciter is represented as being a single-phase unit. It will be appreciated, of course, that the current transformer exciter may be made multiple-phase as indicated in FIGS. 5 and 7. In this instance, each of the phase windings of the motor is provided with a tap which is connected to the tap of a respective primary winding 91, 92, 93 of the primary of the current transformer exciter which is designated generally 90 in FIG. 5. The secondary of the current transformer exciter is shown as a three-phase, star connected unit 94, and is magnetically coupled to the respective primary windings above mentioned. The output of the secondary is taken to a rectifier system which may be a full wave rectifier 96 and the rectified voltage is taken to conventional slip rings and thence to the main generator field winding, here designated 98. If the rotating current transformer exciter is separately driven, or is used in a brushless unit as above described, its connections can be made as a rotating frequency converter so that the frequency of its output to the rectifier system differs from the frequency of the main generator by an amount determined by the relative speed of rotation and number of poles of the motor and of the windings of the current transformer exciter.

FIG. 9 shows the basic system applied to an independently driven exciter 100. In this unit, the exciter has its own prime mover 101, and the motor 102 is coupled to a load 104. As in the previously described forms the exciter primary takes current from the motor line windings at line frequency. The exciter 100 is operated as a rotating current transformer induction frequency converter, being driven at the same speed or faster or slower than the motor, and the delivered voltage of the exciter is at a frequency proportional to the relative speeds of the exciter primary magnetic field and the exciter secondary rotating member and to the relative number of poles in the exciter and motor power windings. As noted above, the primary field 16 carries its voltage at the frequency of the motor, but the output frequency of the rotating member 17 can be changed as desired by changing the speed, or direction of rotation, of the prime mover 101. The output voltage of the exciter winding 17 is rectified by a rectifier 30 and applied to the field winding 12 of the motor. If the rectifier 30 is a stationary unit, slip rings must, of course, be used to lead the exciter voltage to the motor field.

In place of the tapped power winding of the motor, the present invention comprehends the use of a separate auto-transformer connected across one or each of the phases of the motor line voltage winding 10. Further, the present invention also includes the use of a conventional current transformer exciter as a stationary element rather than the rotating current transformer induction frequency converter exciter element described in the previous forms. Such modification of the invention is shown in FIG. 8. In this case the auto-transformer is indicated at 111 and has a tap 112 which is connected to the tap of a divided primary winding 113 of the current transformer exciter which is here designated 114. The secondary of the current transformer exciter is shown at 115, and the rectifier associated therewith is indicated at 116. The rectified output of the current transformer exciter is applied to the field winding 117 of the motor through slip rings 118. In this instance both the auto-transformer and the current transformer exciter may be made stationary elements. It will be appreciated, however, that the stationary current transformer exciter can be supplied with voltage from the tap of the motor power winding as in the forms previously described. In either event, the voltage to the current transformer exciter represents only a small fraction of the voltage of the motor power winding.

The variable impedance controls diagrammatically indicated in FIGS. 6 and 7 can, of course, be used equally well with the system shown in FIG. 8.

It will be seen that the present invention provides a simple and effective means of providing motor field excitation involving primarily a current transformer exciter to furnish a rectified exciter output that is inherently sensitive to load current, to assure a very fast response of the exciter output upon a change in motor line current.

What I claim is:

1. In a synchronous motor having a power winding and rotating field winding, means to supply a voltage to said field winding comprising a rotating current transformer induction frequency converter exciter, said exciter having a tapped stationary primary winding, one of said primary windings being connected across an A.C. voltage derived from the motor line voltage and representing only a small portion of said motor line voltage, and another of said exciter stationary windings being connected in series with said motor line circuit to provide an inherent approximate constant power factor of said motor by increasing or decreasing the power output of said current transformer exciter by an increase or decrease in the motor line current, a rotating rectifier connected to said exciter secondary winding to supply rectified voltage to said motor field winding, a rotating resistor unit permanently connected in parallel with the motor field winding to limit the induced motor field voltage during starting and acceleration, the motor rotor, exciter rotor, rotating rectifier, and rotating resistor unit being mounted on a common shaft, and means to control the rectified secondary output of the exciter comprising a variable impedance in the circuit of said primary exciter winding.

2. In a synchronous motor having a power winding and rotating field winding, means to supply a voltage to said field winding comprising a rotating current transformer induction frequency converter exciter, said exciter having a tapped stationary primary winding, one of said primary windings being connected across an A.C. voltage derived from the motor line voltage and representing only a small portion of said motor line voltage, and another of said exciter stationary windings being connected in series with said motor line circuit to provide an inherent approximate constant power factor of said motor by increasing or decreasing the power output of said current transformer exciter by an increase or decrease in the motor line current, a rotating rectifier connected to said exciter secondary winding to supply rectified voltage to said motor field winding, a rotating resistor unit permanently connected in parallel with the motor field winding to limit the induced motor field voltage during starting and acceleration, the motor rotor, exciter rotor, rotating rectifier, and rotating resistor unit being mounted on a common shaft, and means to control the rectified secondary output of the exciter.

References Cited in the file of this patent

UNITED STATES PATENTS

| 2,414,287 | Crever | Jan. 14, 1947 |
| 2,497,141 | Schultz | Feb. 14, 1950 |
| 2,722,652 | Brainard | Nov. 1, 1955 |
| 2,992,380 | Potter | July 11, 1961 |